(12) United States Patent
Dagan et al.

(10) Patent No.: US 12,265,582 B2
(45) Date of Patent: Apr. 1, 2025

(54) QUERY MODALITY RECOMMENDATION FOR E-COMMERCE SEARCH

(71) Applicant: eBay Inc., San Jose, CA (US)

(72) Inventors: Arnon Dagan, Kfar Vitkin (IL); Slava Novgorodov, Rishon LeZion (IL); Ido Guy, Haifa (IL)

(73) Assignee: eBay Inc, San Jose, CA (US)

( * ) Notice: Subject to any disclaimer, the term of this patent is extended or adjusted under 35 U.S.C. 154(b) by 63 days.

(21) Appl. No.: 17/569,876

(22) Filed: Jan. 6, 2022

(65) Prior Publication Data
US 2023/0214431 A1 Jul. 6, 2023

(51) Int. Cl.
*G06F 16/9532* (2019.01)
*G06Q 30/0601* (2023.01)

(52) U.S. Cl.
CPC ..... *G06F 16/9532* (2019.01); *G06Q 30/0641* (2013.01)

(58) Field of Classification Search
None
See application file for complete search history.

(56) References Cited

U.S. PATENT DOCUMENTS

| | | | |
|---|---|---|---|
| 10,706,098 B1 * | 7/2020 | Ramesh | G06F 16/58 |
| 2003/0018652 A1 * | 1/2003 | Heckerman | G06F 16/358 |
| 2006/0271564 A1 * | 11/2006 | Meng Muntz | G06Q 10/00 |
| 2008/0212899 A1 * | 9/2008 | Gokturk | G06F 16/5854 |
| | | | 382/305 |
| 2010/0205202 A1 | 8/2010 | Yang et al. | |
| 2014/0188931 A1 * | 7/2014 | Smiling | G06F 16/9532 |
| | | | 707/770 |
| 2014/0195506 A1 * | 7/2014 | Perlegos | G06F 16/3322 |
| | | | 707/706 |
| 2015/0012519 A1 * | 1/2015 | He | G06F 16/951 |
| | | | 707/706 |
| 2018/0107682 A1 | 4/2018 | Wang et al. | |

* cited by examiner

*Primary Examiner* — Kannan Shanmugasundaram
(74) *Attorney, Agent, or Firm* — Shook Hardy & Bacon LLC (57) ABSTRACT

A query modality recommendation system provides recommendations to use a particular query modality based on one or more categories of search results for a search query. Upon receiving a search query in a first query modality at a search engine, the query modality recommendation system determines to recommend use of a second query modality based on one or more categories of the search results. For example, the first query modality may be a textual query and the second query modality may be an image query. In aspects, recommending use of the second query modality comprises comparing a first search performance of the one or more categories for the first query modality in historical search queries to a second search performance of the one or more categories for the second query modality in the historical search queries.

16 Claims, 6 Drawing Sheets

KL text to image top 10

| leaf category | kl text-image |
|---|---|
| Clothing, Shoes & Accessories:Women:Women's Clothing:Coats, Jackets & Vests | 0.03967519928 |
| Clothing, Shoes & Accessories:Men:Men's Clothing:Coats & Jackets | 0.03891293026 |
| Cell Phones & Accessories:Cell Phones & Smartphones | 0.03425363658 |
| Clothing, Shoes & Accessories:Men:Men's Clothing:Shirts:T-Shirts | 0.02855332953 |
| Clothing, Shoes & Accessories:Men:Men's Shoes:Athletic Shoes | 0.02734420761 |
| Sports Mem, Cards & Fan Shop:Sports Trading Cards:Basketball Cards | 0.01811737507 |
| Cell Phones & Accessories:Cell Phone Accessories:Cases, Covers & Skins | 0.01716497003 |
| Clothing, Shoes & Accessories:Women:Women's Clothing:Tops | 0.0148867262 |
| Video Games & Consoles:Video Games | 0.01480533995 |

FIG. 3

KL image to text top 10

| leaf category | kl image-text |
|---|---|
| Collectibles:Decorative Collectibles:Mugs, Cups | 0.01743816805 |
| Collectibles:Lamps, Lighting:Lamps:Electric:Table Lamps | 0.0083629138178 |
| Collectibles:Decorative Collectibles:Collector Plates | 0.0078912272932 |
| Collectibles:Decorative Collectibles:Vases | 0.0078721363544 |
| Collectibles:Decorative Collectibles:Decorative Collectible Brands:HOMCO:Pictures | 0.0062625384399 |
| Toys & Hobbies:TV & Movie Character Toys | 0.0061207188155 |
| Pottery & Glass:Glass:Art Glass:North American:Fenton | 0.0056397040054 |
| Collectibles:Decorative Collectibles:Wall Hangings, Mirrors | 0.0056017933394 |
| Jewelry & Watches:Vintage & Antique Jewelry:Costume:Retro, Vintage 1930s-1980s:Necklaces & Pendants | 0.0054251476325 |
| Home & Garden:Kitchen, Dining & Bar:Glassware & Drinkware | 0.0052089163077 |

QUERY MODALITY RECOMMENDATION FOR E-COMMERCE SEARCH

BACKGROUND

Many search systems allow users to submit search queries using different query modalities. For instance, the different query modalities may include text-based searches (textual modality) and image-based searches (image modality). A search query using textual modality comprises text that is entered, for instance, by a user typing text or providing voice input (which is converted to text). A search query using image modality comprises an image input by a user. For a given user query received in a query modality, a search engine can process the user query to identify search results and to provide the results on a user interface as a response to the user query. While different query modalities provide users with flexibility of the type of search query submitted to a search system, existing search systems often do not provide search results that satisfy an intent of the user.

SUMMARY

At a high level, aspects described herein relate to providing a query modality recommendation for a search query, thereby eliminating or reducing the need for repetitive user queries, search result selections, search filter selections, and the like by enabling a search engine to return search results based on content usage that matches an intent of a user. In accordance with aspects of the technology described herein, a search query is received at a search engine in a first query modality. As an example, the first query modality is an image query or a textual query. One or more categories associated with search results for the search query are identified. Based on the one or more categories, a determination is made to recommend use of a second query modality that is different than the first query modality. In response to the determination, a recommendation to use the second query modality is provided to a user device.

The Summary is intended to introduce a selection of concepts in a simplified form that is further described in the Detailed Description of this disclosure. The Summary is not intended to identify key or essential features of the claimed subject matter, nor is it intended to be used as an aid in determining the scope of the claimed subject matter. Additional objects, advantages, and novel features of the technology will be provided, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

While search engines are an incredibly useful tool for providing search results for received search queries, shortcomings in existing search technologies often result in the consumption of an unnecessary quantity of computing resources (e.g., I/O costs, network packet generation costs, throughput, memory consumption, etc.). When performing searches, users are often seeking particular search results. For instance, in the context of product search, a user may be seeking a particular item that has a particular style, design, or color. Existing search technologies often comingle search results or provide search results that are too vast and broad, which then requires the user to submit additional search queries or multiple filters to obtain the desired search results pertaining to the particular item.

For example, a search engine may receive a text-based query of "vintage Pyrex bowl" and subsequently provide a set of search results comprising bowls with various colors, patterns, and sizes. The user may browse multiple pages of the search results and select multiple filters to access the particular vintage Pyrex bowl that the user desires. This process of browsing, and filter selection unnecessarily consumes various computing resources of the search system, such as processing power, network bandwidth, throughput, memory consumption, etc. In some instances, the multiple pages of the search results provided by the existing search engine may even completely fail to satisfy the user's goal, thus requiring the user to spend even more time and computing resources on the search process by repeating the process of issuing additional queries and selecting more filters until the user finally accesses the desired content items. In some cases, the user may even give up searching because the search engine was not able to return desired search results after multiple searches.

These shortcomings of existing search technologies adversely affect computer network communications. For example, each time a query is received, contents or payload of the search queries is typically supplemented with header information or other metadata, which is multiplied by all the additional queries needed to obtain the particular item the user desires. As such, there are throughput and latency costs by repetitively generating this metadata and sending it over a computer network. In some instances, these repetitive inputs (e.g., repetitive clicks, selections, or queries) increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. Further, if multiple users repetitively issue queries, it is expensive because processing queries consumes a lot of computing resources. For example, for some search engines, a query execution plan may need to be calculated each time a query is issued, which requires a search system to find the least expensive query execution plan to fully execute the query. This decreases throughput and increases network latency, and can waste valuable time.

Aspects of the technology described herein improve the functioning of the computer itself in light of these shortcomings in existing search technologies by providing a solution that enables a search engine to provide search results that match a user's intent. In particular, some aspects are directed to a search engine able to provide a recommendation to use a different query modality for performing a search. To facilitate this, the search engine receives a search query in an initial query modality. Subsequently, one or more categories of search results for the search query are identified. Based on the one or more categories identified, a determination is made to recommend use of a query modality different than the initial query modality. In response to the determination, a recommendation to use the query modality different than the initial query modality is provided.

In accordance with some aspects, the technology described herein leverages one or more categories associated with search results for a search query in an initial query modality to determine to recommend the different query modality. For instance, suppose a user initially submits an image query with an image of a computer. Given this search query, the search engine identifies search results in which most of the search results are for products in the "computer" category. The search system determines that a textual modality is better suited at providing search results in the "computer" category, and provides a recommendation to use the textual modality for the search. As another example, suppose a user initially submits a textual query to search for a bowl. Given this search query, the search engine identifies search results in which most of the search results are for products in the "kitchen" category. The search system determines that an image modality is better suited at providing search results in the "kitchen" category, and provides a recommendation to use the image modality for this search. While these examples illustrate the use of a single category from the search results for determining whether to recommend a different query modality, in other configurations, multiple categories from the search results may be used. The determination of which query modality is better suited for different categories may be based on the performance of the different categories for each query modality in historical search queries. The performance may be based on the frequency with which each category is associated with search results for historical search queries for each query modality. In some configurations, this is determined using the distribution of categories associated with search results in historical search queries using each query modality. For instance, given historical search queries using a first query modality (e.g., textual modality), a first distribution of categories associated with search results for those historical search queries may be determined. Additionally, given historical search queries using a second query modality (e.g., image modality), a second distribution of categories associated with search results for those historical search queries may be determined. The performance of each category between the different query modalities may be determined based on a comparison of the two distributions. For example, the comparison of the first distribution to the second distribution may include use of a non-symmetric distance measure between the two distributions.

Aspects of the technology described herein provide a number of improvements over existing search technologies. For instance, computing resource consumption is improved relative to existing technologies. In particular, the recommendation to use a different query modality enables the search engine to return search results that match a user intent, thereby allowing the user to more quickly access relevant search results. The search engine enables the user to quickly search more relevant results to the particular item desired by the user, or to discover another item that is new to the user based on the user's intent. This eliminates (or at least reduces) the repetitive user queries and filter selections because the search results comprise search results that more closely correspond to what the user is seeking. Accordingly, aspects of the technology described herein decrease computing resource consumption, such as processing power and network bandwidth. For instance, a user query (e.g., an HTTP request), would only need to traverse a computer network once (or fewer times relative to existing technologies).

In like manner, aspects of the technology described herein improve storage device or disk I/O and query execution functionality. As described above, the inadequate search results provided by existing search technologies results in repetitive user queries and filter selections. This causes multiple traversals to disk I/O. In contrast, aspects described herein reduce storage device I/O because the user provides a reduced amount of inputs so the computing system does not have to reach out to the storage device as often to perform a read or write operation. For example, by providing a search query in the recommended modality, the search engine can respond with search results that satisfy the user intent. Accordingly, there is not as much wear due to query execution functionality.

Having briefly described an overview of aspects of the technology described herein, an exemplary operating environment in which aspects of the technology described herein may be implemented is described below.

Figure 1:
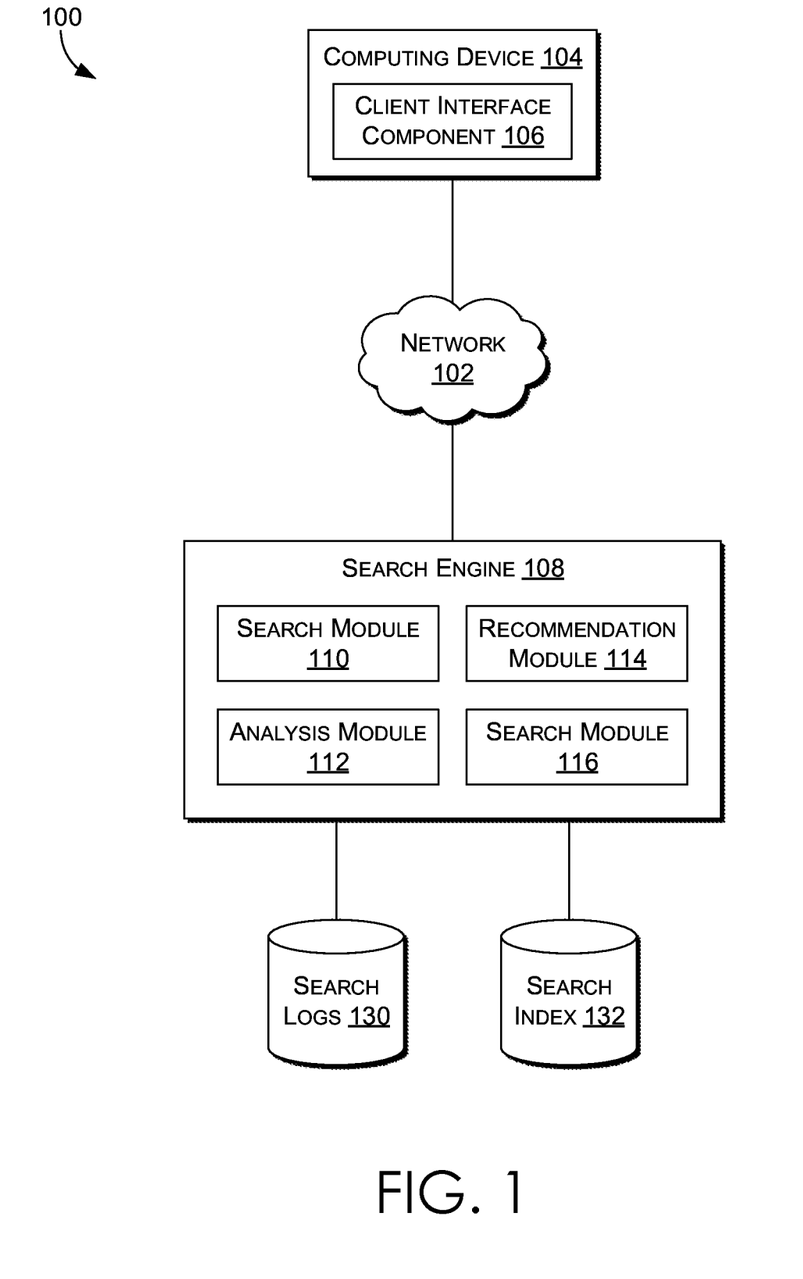
FIG. 1 is a block diagram of an example operating environment suitable for implementing aspects of the technology.

Turning now to FIG. 1, a block diagram is provided showing an operating environment 100 in which aspects of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a network 102; a computing device 104 having a client interface component 106; search engine 108 having a search module 110, an analysis module 112, a recommendation module 114, and a user interface module 116; search logs 130; and a search index 132. It should be understood that environment 100 shown in FIG. 1 is an example of one suitable operating environment. Each of the components shown in FIG. 1 may be implemented via any type of computing device, such as computing device 600, described below in connection to FIG. 6, for example.

These components may communicate with each other via the network 102, which may include, without limitation, one or more local area networks (LANs) and/or wide area networks (WANs). In exemplary implementations, the network 102 comprises the Internet and/or a cellular network, amongst any of a variety of possible public and/or private networks. In aspects, the network 102 may include multiple networks, as well as being a network of networks, but is shown in more simple form so as to not obscure other aspects of the present disclosure.

It should be understood that any number of user devices, servers, and data sources may be employed within the operating environment 100 within the scope of the present disclosure. Each may comprise a single device or multiple devices cooperating in a distributed environment. For instance, the search engine 108 may be provided via multiple devices arranged in a distributed environment that collectively provide the functionality described herein. Additionally, other components not shown may also be included within the distributed environment.

The computing device 104 can be a client device on the client-side of the operating environment 100, while the search engine 108 can be on the server-side of operating environment 100. For example, the search engine 108 can comprise server-side software designed to work in conjunction with client-side software on the computing device 104 so as to implement any combination of the features and functionalities discussed in the present disclosure. This division of the operating environment 100 is provided to illustrate one example of a suitable environment, and there is no requirement for each implementation that any combination of the search engine 108 and the computing device 104 remain as separate entities. While the operating environment 100 illustrates a configuration in a networked environment with a separate computing device, search engine, search logs, and search index, it should be understood that other configurations can be employed in which components are combined. For instance, in some configurations, a computing device may also serve as a data source and/or may provide search capabilities.

The computing device 104 may comprise any type of computing device capable of use by a user. For example, in one aspect, the computing device 104 may be the type of computing device 600 described in relation to FIG. 6 herein. By way of example and not limitation, a computing device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where search queries may be performed via the client interface component 106 or where notifications can be presented via the client interface component 106. A user may be associated with the computing device 104. The user may communicate with the search engine 108 through one or more computing devices, such as the computing device 104.

At a high level, the search engine 108 receives a search query in a first query modality from the computing device 104 (or another computing device not depicted). In aspects, the first query modality may comprise one or more of the following: a text-based query (e.g., a natural language query or structured query) comprising one or more keywords, an audio query comprising voice or other audio input, an image query comprising image data, any other type of query modality, or any combination thereof. The search query may comprise any type of input from a user for initiating a search. In response to receiving the search query, the search engine 108 identifies one or more categories of search results for the search query. The one or more categories may be one or more dominant categories (e.g., a most common category associated with search results of the search query).

In aspects, categories are associated with an item (e.g., an item for sale by a seller via an e-commerce computing-environment associated with an application or website) and an item listing (e.g., a description relating to the item comprising one or more of a price in a currency, reviews, shipment options, a rating, a condition of the item, a size of the item, a color of the item, etc.). In aspects, the one or more categories comprise meta-categories and leaf categories associated with a tree structure. For example, the meta-categories are each divisible into subcategories (or branch categories), whereas leaf categories are not divisible. In one non-limiting example, meta-categories may include, from broadest meta-category to the narrowest meta-category, "collectibles," "lighting," "lamps," and "electric lamps"; and a leaf category for the "electric lamps" meta-category may include "table lamps."

In some configurations, the search engine 108 may be embodied on one or more servers. In other configurations, the search engine 108 may be implemented at least partially or entirely on a user device, such as computing device 600 described in FIG. 6. The search engine 108 (and its components) may be embodied as a set of compiled computer instructions or functions, program modules, computer software services, or an arrangement of processes carried out on one or more computer systems.

As shown in FIG. 1, the search engine 108 includes the search module 110, the analysis module 112, the recommendation module 114, and the user interface module 116. In one aspect, the functions performed by modules of the search engine 108 are associated with one or more personal assistant applications, services, or routines. In particular, such applications, services, or routines may operate on one or more user devices (such as computing device 104) or servers (e.g., the search engine 108), or may be distributed across one or more user devices and servers. In some aspects, the applications, services, or routines may be implemented in the cloud. Moreover, in some aspects, these modules of the search engine 108 may be distributed across a network, including one or more servers and client devices (such as computing device 104), in the cloud, or may reside on a user device such as computing device 104.

In addition, the modules of the search engine 108 and the functions and services performed by these modules may be implemented at appropriate abstraction layer(s) such as an operating system layer, an application layer, or a hardware layer, etc. Alternatively, or in addition, the functionality of these modules (or the aspects of the technology described herein) can be performed, at least in part, by one or more hardware logic components. For instance, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Further, although functionality is described herein with regards to specific modules shown in search engine 108, it is contemplated that in some aspects, functionality of one of the modules can be shared or distributed across other modules.

The search module 110 identifies search results in response to search queries processed against search index 132, which is described in more detail below. For example, the search module 110 may query the search index 132 to identify stored information pertaining to items that satisfy criteria of the search query and provide the items as search results. The search module 110 may also determine one or more categories (including a leaf category and/or one or more meta-categories) associated with each item identified as a search result. In some aspects, an item may be an item listing for a product, and the information pertaining to the one or more categories for the item may be identified from the item listing (which may include a variety of additional information, such as price, price range, quality, condition, ranking, material, brand, manufacturer, etc.).

The analysis module 112 determines whether to recommend use of a second query modality different than a first query modality of a received search query. The analysis module makes the determination based on the one or more categories associated with the search results identified for the search query by the search module 110. For instance, when search module 110 processes an image search query to identify an initial set of search results, analysis module 112 may determine to provide a recommendation to use a text search query based on the one or more categories associated with the search results for the image search query (e.g., a meta-category of "paper money" and a leaf category of "Nepali paper money"). Alternatively, when the search module 110 processes a text search query to identify an initial set of search results, the analysis module 112 may determine to provide a recommendation to use an image search query based on the one or more categories associated with the search results for the text search query. Modalities other than text and image may be used as well.

In some configurations, the analysis module 112 determines a dominant category associated with an initial search query in a first modality by identifying a most common category of search results for the initial search query. Continuing the example, the most common category may be considered for a plurality of search results that are ranked above a threshold. In some embodiments, the most common category is determined from categories from a top number of the search results (e.g., the top 40 search results). In some embodiments, the most common category is determined from categories of the search results that satisfy a threshold (e.g., the top 0.01% of the search results). In some configurations, the analysis module 112 determines multiple dominant categories associated with an initial search query in a first modality by identify N categories that appear most frequently in the search results. In still further configurations, the analysis module 112 determines a distribution of categories associated with an initial search query in a first modality. Accordingly, analysis module may employ a single dominant category, multiple dominant categories, or a distribution of categories associated with search results for a search query using an initial query modality when determining whether to recommend a different query modality.

In aspects, analysis module 112 determines to recommend use of a second query modality different from a first query modality of a search query based on performance of the one or more categories of the search results for the search query in historical search queries. The performance of a category for different query modalities is based on the frequency with which the category is associated with search results of historical search queries in each of the different query modalities. Information regarding historical search queries may be determined from the search logs 130, which is described in more detail below.

In some configurations, the analysis module 112 compares a first search performance of one or more categories associated with the search results for the search query to a second search performance of the one or more categories associated with the search results. The first search performance may be determined from historical search queries in the first query modality and the second search performance may be determined from historical search queries in the second query modality. Further, the categories associated with the search performances may be dominant categories that are the most common categories considered from search results of the historical search queries in the first and second query modalities. In some aspects, the categories associated with the search performances may be dominant categories for one or more meta-categories, one or more leaf categories, or a combination of meta-categories and leaf categories. In aspects, the search performances are associated with a clickthrough rate, a type of user device in which the historical search query was received from (e.g., a smartphone, tablet, PC, etc.), a number of purchases associated with each of the historical search queries, latency data, and so forth. For example, search results for the search query may be ranked higher based on particular results having a higher clickthrough rate, and search queries returning more search results with high clickthrough rates may have better search performances.

In aspects, the analysis module 112 determines to recommend use of the second query modality by determining distributions for the categories associated with the historical search queries in the first and second query modalities and comparing the distributions. The distributions may include a distribution for a meta-category for each of the text and image historical search queries and a distribution for a leaf category for each of the text and image historical search queries. In aspects, a meta-category distribution for text historical queries is compared to the meta-category distribution for image historical queries. Continuing the example, a leaf category distribution for text historical queries is subsequently compared to the leaf category distribution for image historical queries. For example, the distributions may be compared using one or more similarity measures, such as a cosine similarity or a non-symmetric distance measure, such as Kullback-Leibler (KL) divergence (also known as relative entropy). One or more of the comparisons may then be used to determine the search performances of the image search query and the text search query of the historical search queries for determining whether to recommend use of the second query modality.

Based on the one or more categories or the comparison, recommendation module 114 may recommend use of the second query modality. In some aspects, based on the one or more categories or the comparison, recommendation module 114 may not recommend use of the second query modality. In some aspects, recommendation module 114 may automatically recommend use of the second query modality before a user completes typing in a full textual search query (e.g., before the user types in a complete word or before the user types in the last word of a plurality of words). In some aspects, recommendation module 114 may recommend use of the second query modality after the user begins selecting filters in response to the user receiving search results subsequent to submitting the search query in the first modality.

The user interface module 116 is configured to receive the search queries in various query modalities. Additionally, the user interface module 116 may be configured to communicate the search query, search results for the search query, item listings associated with the search query, one or more categories of search results, or recommendations to use the second query modality to other modules of search engine 108, such as the analysis module 112 for example. Further, the user interface module 116 may be configured to transmit the search results for the search query, item listings associated with the search query, one or more categories of search results, or recommendations to use the second query modality to computing devices, such as computing device 104.

Continuing the example, the user interface module 116 may cause one or more graphical user interface displays of various computing devices to display the search query, item listings associated with the search query, one or more categories of search results, or recommendations to use the second query modality. In aspects, interface module 116 causes the client interface component 106, through which the search query is input (e.g., by a user in a search tool on a web page), to display the recommendation to use the second query modality. Further, the interface module 116 may comprise an Application Program Interface (API) that allows applications to submit the search query in various modalities (and optionally other information, such as user information, contextual information, and the like) for receipt by the search engine 108.

The search logs 130, in some embodiments, may be embodied on a plurality of databases, wherein one or more of the databases comprise one or more hardware components that are part of the search engine 108. In aspects, the search logs 130 are configured for storing information regarding historical search sessions for users, including, for instance, search queries submitted by a plurality of users via client interface components (e.g., client interface component 106), search results associated with the historical search queries, item listings for the search results, or user interactions (e.g., hovers, click-throughs, purchases, etc.) associated with the search results. In some embodiments, the search logs 130 store a timestamp (e.g., day, hour, minute, second, etc.) for each user query submitted in various modalities, search result, item listing associated with the search result, user interaction with the search result, and so forth.

In addition, the information stored in search logs 130 regarding historical search sessions may include other result selection information, such as subsequent filters selected in response to receiving search results and item listings. In some embodiments, result selection information may include the time between two successive selections of search results, the language employed by the user, and the country where the user is likely located (e.g., based on a server used to access the search engine 108). In some implementations, other information associated with the historical search sessions that is stored may comprise user interactions with a ranking displayed within an item listing, negative feedback displayed with the item listing, and other information such as whether the user clicked or viewed a document associated with an item listing. User information including user cookies, cookie age, IP (Internet Protocol) address, user agent of the browser, and so forth, may also be stored in search logs 130. In some embodiments, the user information is recorded in the search logs 130 for an entire user session or multiple user sessions.

The information stored in the session logs 130 or in search index 132 can be used by the search engine 108 for determining whether to recommend use of the second query modality. Additional search queries submitted in various modalities and one or more categories associated with search results of the search queries may be used to improve future or additional determinations to recommend use of the second query modality. Further, the search logs 130 and search index 132 may comprise data sources or data systems, which are configured to make data available to any of the various constituents of operating environment 100. Search logs 130 and search index 132 may be discrete components separate from search engine 108 or may be incorporated or integrated into the search engine 108 or other components the operating environment 100. Among other things, the search logs 130 and search index 132 can store search results associated with search queries in various modalities about which information can be indexed in search index 132 associated with the search engine 108.

The search index 132 can take the form of an inverted index, but other forms are possible. The search index 132 stores the information about items in a manner that allows the search engine 108 to efficiently query the search index 132 based on the search query, as well as any additional information provided in conjunction with the search query (e.g., user information such as an IP address), in order to identify search results for a search query. The search engine 108 can be configured to run any number of queries on the search index 132.

Search index 132, according to an example embodiment, stores data items including named fields that enable access to one or more categories associated with search query items queried in various modalities. For example, search index 132 may include an inverted index storing a mapping from image data or text in historical image or textual search queries to items, each item associated with one or more categories including one or more meta-categories, one or more leaf categories, a combination of meta-categories, and a combination of leaf categories.

In one embodiment, search index 132 may include one or more tables of hierarchical categories associated with meta-categories and leaf categories. For example, meta-categories, from broadest to narrowest, may include "clothing," "shoes and accessories," and "women's shoes"; and the leaf category may include "heels." As another example, parent category "car" may have a "Ford" child category, which in turn may have a "Taurus" child category. The one or more tables may include an identifier field containing a unique category identifier for each of a plurality of category records and a name field for a relevant category, such as "sports trading cards," for example. To illustrate, the identifier field for "Ford" may be 7000 and the identifier field for "Taurus" may be 7001. Furthermore, the name field may be associated with a statistical value corresponding to a performance of the relevant category corresponding to historical user search queries in a particular query modality. The statistical value may be based on user interactions with search result items from the search queries in the particular query modality. For example, "user interactions" may include item views, item bids, item purchases, item subscriptions, sharing the item online, providing feedback on the item, and so forth.

Figure 2:
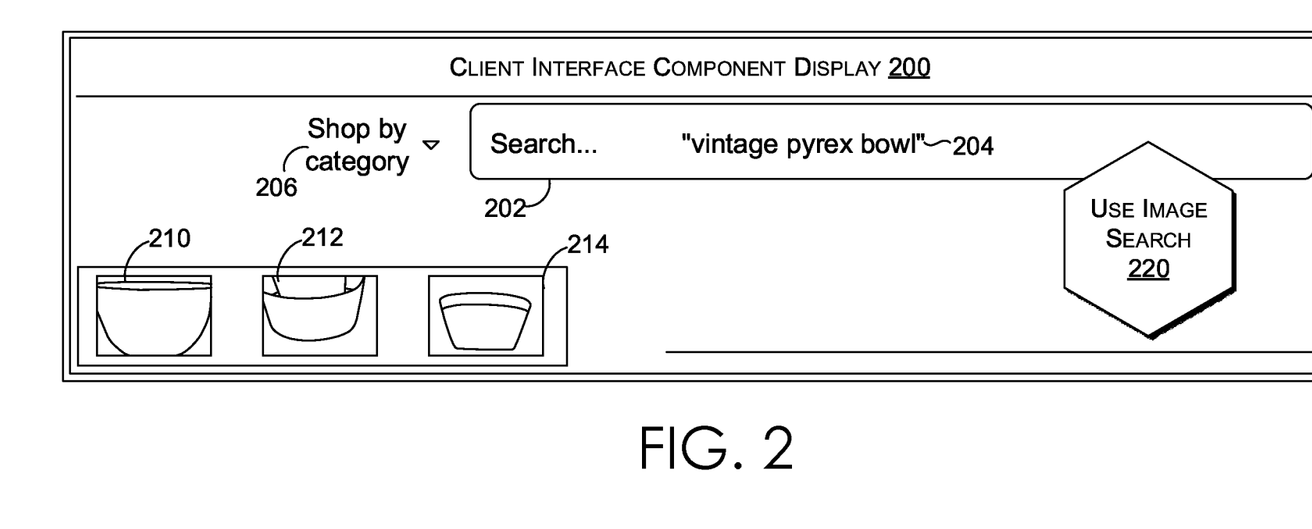
FIG. 2 is an example user interface showing a recommendation to use a second query modality, according to an aspect of the technology described herein.

Turning now to FIG. 2, example client interface component display 200 illustrates a search tool 202, a textual search query 204, a category filter option 206, search results 210, 212, and 214, and a recommendation to use an image search query modality 220. FIG. 2 illustrates an example showing a recommendation to use a second query modality. For example, the recommendation to use the second query modality may be determined based on search engine 108 using analysis module 112 depicted in FIG. 1.

Beginning with search tool 202, search tool 202 can provide a search input box configured to process a natural language query entered by a user to identify search keywords, search results, item listings associated with the search results, and categories of the search results. In the example of FIG. 2, a user has submitted the textual user query 204: "vintage pyrex bowl." In that case, the search engine 108 depicted in FIG. 1 may identify relevant items and item listings given the textual user query 204.

In some aspects, the user may select filter 206 to narrow the search results further upon receipt of the search results. In some aspects, category filter 206 may provide category options for the user, such as color, design, or size. Upon selection of filter 206, the search results 210, 212, and 214 may be displayed. In some implementations, search results 210, 212, and 214 are displayed prior to the user selecting category filter 206. In some implementations, the search results 210, 212, and 214 are displayed based on prior selections the user made via category filter 206.

Based on categories of the search results, client interface component display 200 provides for display the recommendation to use the image search 220. The recommendation to use the image search 220 may be displayed in various embodiments (e.g., as a different shape or in various colors). The recommendation to use the image search 220 may be displayed immediately and prior to the user selecting category filter 206. In aspects, the recommendation to use the image search 220 is displayed in response to displaying the search results 210, 212, and 214 and in response to the user selecting category filter 206. In some aspects, recommendation to use the image search 220 may be displayed immediately and prior to the user completely typing or speaking "vintage pyrex bowl." As discussed in more detail below, the determination to provide the recommendation to use the image search 220 may be based on one or more categories associated with search results 210, 212, and 214 or based on a most common category associated with the search results 210, 212, and 214.

Figure 3:
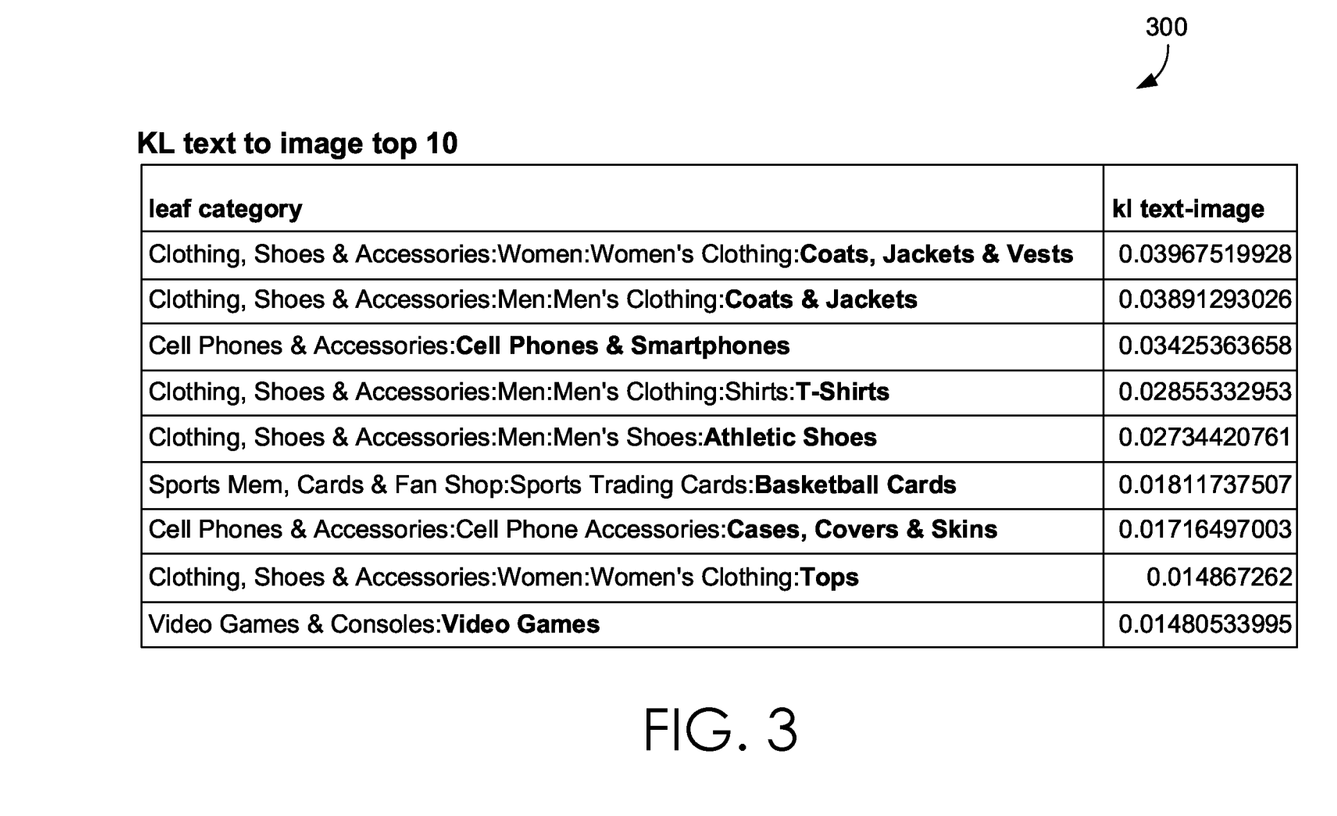
FIG. 3 is a table showing an example of divergence values associated with a category distribution comparison, according to an aspect of the technology described herein.

Turning to FIG. 3, example table 300 provides an example of divergence values associated with a category distribution comparison for two query modalities, textual modality and image modality. In particular, KL divergence values were computed for categories based on comparison of the distributions of categories in search results for historical search queries using text-based queries and image-based queries. As depicted in example table 300, the top ten text-to-image leaf categories are listed based on KL divergence values. The "coats, jackets & vests" leaf category (having the "clothing," "shoes and accessories," and "women's clothing" meta-categories) has 0.039675 as the KL divergence value. Additionally, the "coats & jackets" leaf category (having the "clothing," "shoes and accessories," and "men's clothing" meta-categories) has 0.0389129 as the KL divergence value. Accordingly, in one example embodiment, a recommendation to use a textual query modality may be provided to a user who provides an image of a jacket for a search query (e.g., via a computing device).

As one example, a distribution for leaf categories of historical search queries in a textual query modality may be compared to a distribution for the leaf categories of historical search queries in an image query modality. Continuing the example, the horizontal axis of the distributions may represent the leaf categories and the vertical axis of the distributions may represent a number of items retrieved in each of the leaf categories. In some aspects, the comparison of the leaf category distributions occurs subsequently to a comparison of meta-category distributions associated with historical search queries in the textual query modality and the image query modality. The comparison of the distributions comprises determining the leaf categories that contribute most to the KL divergence between two distributions (one distribution associated with the textual query modality and the other distribution associated with the image query modality).

Figure 4:
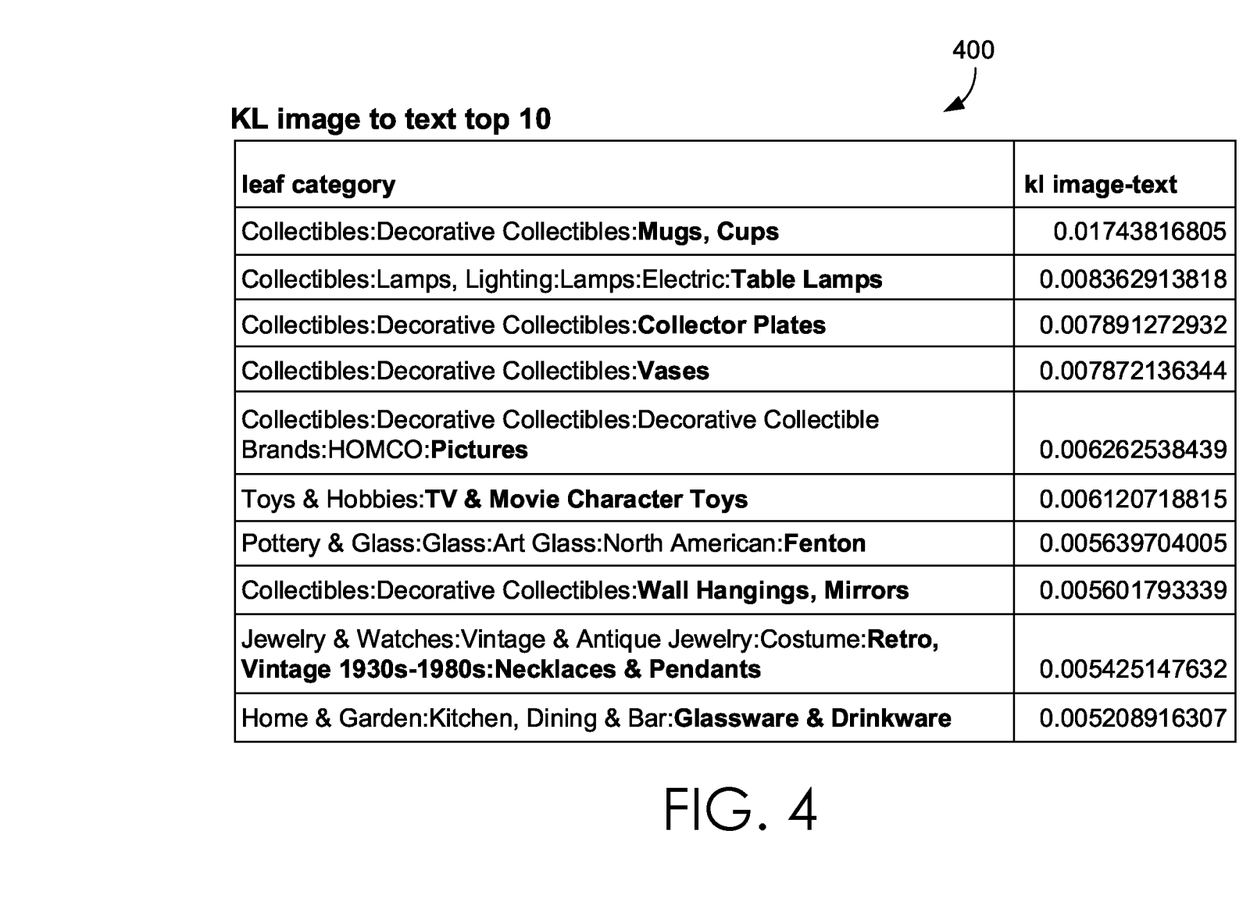
FIG. 4 is another table showing an example of divergence values associated with a category distribution comparison, according to an aspect of the technology described herein.

Turning to FIG. 4, example table 400 provides an example of divergence values associated with a category distribution comparison. As depicted in example table 400, the top ten image-to-text leaf categories are listed based on KL divergence values. The "mugs, cups" leaf category (having the "collectibles" and "decorative collectibles" meta-categories) has 0.017438 as the KL divergence value. Additionally, the "table lamps" leaf category (having the "collectibles," "lamps, lighting," and "electric lamps" meta-categories) has 0.0083629 as the KL divergence value. Accordingly, in one example embodiment, a recommendation to use an image query modality may be provided to a user who provides a textual query of a mug for a search query (e.g., via a computing device).

Figure 5:
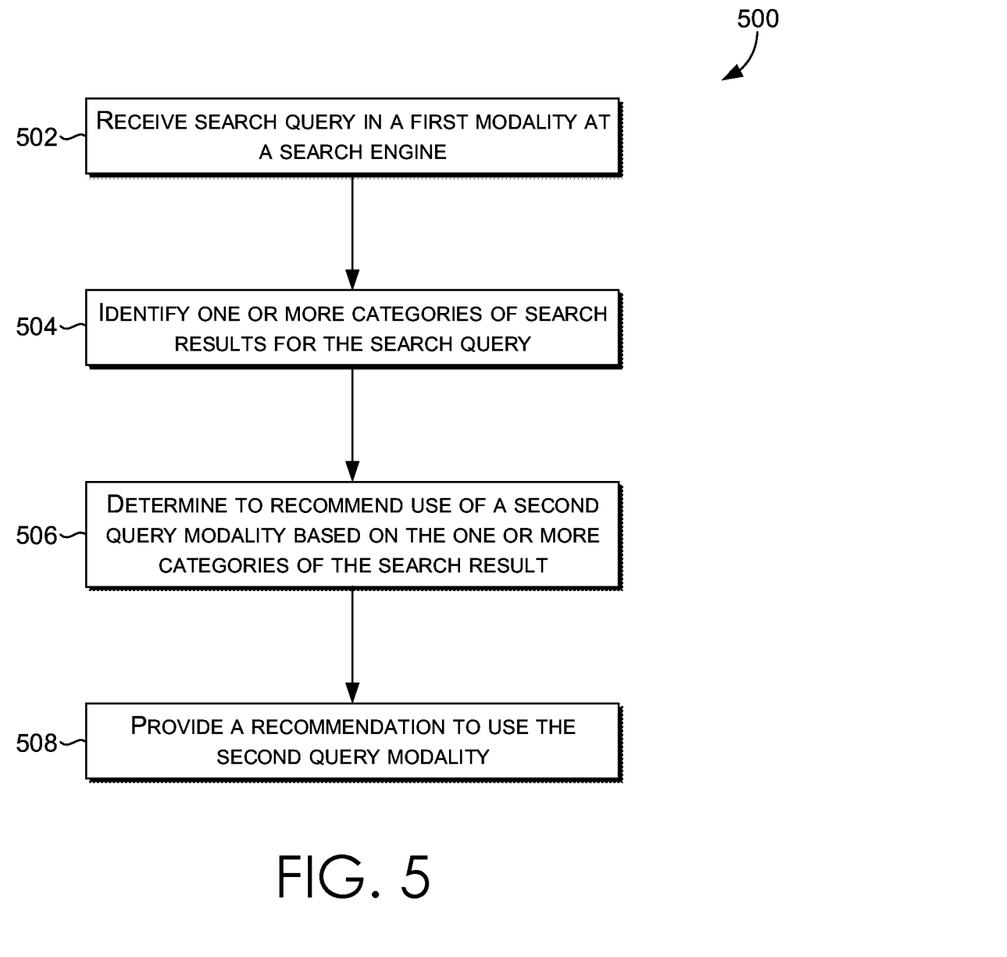
FIG. 5 is a flow diagram showing a method for recommending use of a second query modality, in accordance with an aspect of the technology described herein.

FIG. 5 is a flow diagram showing an example method 500 for providing a recommendation to use a second query modality. The method 500 may be performed, for instance, by the search engine 108 of FIG. 1. As shown at block 502, a search query in a first query modality is received at the search engine. In aspects, the search query may be received from computing device 104 via client interface component 106 of FIG. 1. In an aspect, the first query modality is a textual query. In some aspects, the first query modality is an image query. In some aspects, the first query modality is an audio query.

One or more categories of search results for the search query are identified, as shown at block 504. In some aspects, the one or more categories may include one or more dominant categories of the search results. The one or more dominant categories may comprise the N categories appearing the most frequently in search results for the search query. In some aspects, a distribution of categories for the search results is employed. In some aspects, the one or more categories may comprise leaf categories and meta-categories that are organized in a hierarchical schema.

A determination is made to recommend use of a second query modality based on the one or more categories of the search results, as shown at block 506. For example, the determination may be based on a comparison of a first search performance of the one or more categories for the first query modality in historical search queries to a second search performance of the one or more dominant categories for the second query modality in historical search queries. As another example, the determination to recommend use of the second query modality may be based on determining a first distribution for a plurality of categories associated with a first set of search results for historical search queries using the first query modality. Continuing the example, a second distribution may be determined for the plurality of categories associated with a second set of search results for historical search queries using the second query modality. Continuing the example further, the first distribution may be compared to the second distribution to then determine whether to recommend use of the second query modality. The comparison of the first distribution to the second distribution may comprise, for example, using a non-symmetric distance measure between the first distribution and the second distribution.

In some aspects, the non-symmetric distance measure may include a Kullback-Leibler divergence. Further, meta-categories contributing to a Kullback-Leibler divergence between the first distribution and the second distribution may be determined. Subsequently, a search performance of one or more dominant categories for the first query modality and the second query modality may be determined using the meta-categories that contributed most to the Kullback-Leibler divergence. In some aspects, leaf categories contributing to the Kullback-Leibler divergence between the first distribution and the second distribution may be determined subsequent to determining the meta-categories. The leaf categories that contributed most to the Kullback-Leibler divergence may then be used to determine a search performance.

As shown at block 508, a recommendation to use the second query modality is provided based on the determination to recommend use of the second query modality based on the one or more categories, the one or more dominant categories, or comparisons of distributions or search performances associated with the one or more categories or the one or more dominant categories. For example, the recommendation may be provided for display on client interface component 106 depicted in FIG. 1. As a non-limiting example, the recommendation may be provided for display as depicted by recommendation 220 depicted in FIG. 2.

Figure 6:
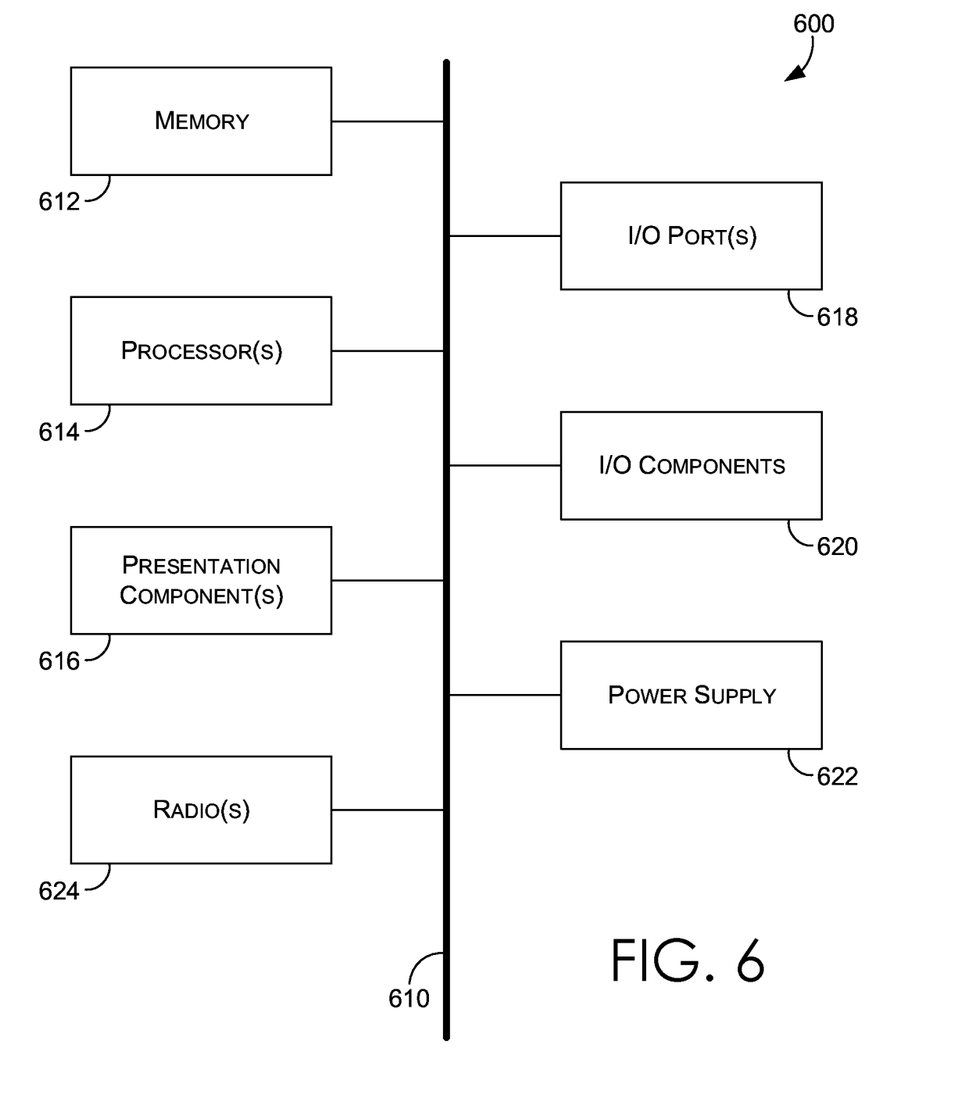
FIG. 6 is an example computing device suitable for implementing the described technology, in accordance with an aspect described herein.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more aspects of the present technology. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc.

The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some aspects of computing device 600 may include one or more radio(s) 924 (or similar wireless communication components). The radio 924 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

What is claimed is:

1. One or more non-transitory computer storage media storing computer-readable instructions that when executed by a processor, cause the processor to perform operations, the operations comprising:
    receiving a search query in a first query modality at a search engine;
    identifying one or more dominant categories associated with search results for the search query;
    determining a performance of the one or more dominant categories for the first query modality and a second query modality based on a first distribution of categories associated with historical search queries in the first query modality and a second distribution of categories associated with historical search queries in the second query modality, the first query modality being a different form of a search query than the second query modality, wherein the historical search queries in the second query modality are associated with a second set of search results for an item associated with the search query that was purchased;
    based on the performance of the one or more dominant categories for the first query modality and the second query modality, causing a recommendation to use the second query modality to be displayed; and
    receiving a second search query in the second query modality.

2. The one or more non-transitory computer storage media of claim 1, wherein the first query modality is an image query and the second query modality is a textual query.

3. The one or more non-transitory computer storage media of claim 1, wherein the historical search queries in the first query modality are associated with a first set of search results for items associated with the search query that were purchased, and wherein determining the performance of the one or more dominant categories comprises:
    determining a non-symmetric distance measurement between the first distribution of categories for the first set of search results for the items associated with the search query and the second distribution of categories in the second query modality; and
    based on the non-symmetric distance measurement, determining that the second distribution has a higher performance than the first distribution.

4. The one or more non-transitory computer storage media of claim 1, wherein the performance of the one or more dominant categories for the first query modality and the second query modality is determined based on comparing the first distribution to the second distribution by determining meta-categories contributing to a Kullback-Leibler divergence between the first distribution and the second distribution.

5. The one or more non-transitory computer storage media of claim 4, further comprising subsequent to determining the meta-categories, determining leaf categories contributing to the Kullback-Leibler divergence between the first distribution and the second distribution.

6. A system for providing a query modality recommendation, the system comprising:
    at least one processor; and
    one or more computer storage media storing computer-readable instructions that when executed by the at least one processor, cause the at least one processor to perform operations comprising:
    receiving a search query in a first query modality at a search engine;
    determining one or more categories associated with search results for the search query;
    determining to recommend use of a second query modality based on the one or more categories, the first query modality being a different form of a search query than the second query modality; and
    providing a recommendation to use the second query modality, instead of the first query modality, for another search query, wherein determining to recommend use of the second query modality comprises:
        determining a first search performance of the one or more categories for the first query modality based on a frequency in which the one or more categories are included in search results of historical queries for the search query in the first query modality;
        determining a second search performance of the one or more categories for the second query modality based on the frequency in which the one or more categories are included in search results of historical queries for the search query in the second query modality; and
        determining to recommend use of the second query modality based on the second search performance being better than the first search performance.

7. The system of claim 6, wherein the first query modality is a textual query and the second query modality is an image query.

8. The system of claim 6, wherein the one or more categories comprises leaf categories, and wherein determining to recommend use of the second query modality comprises:
    determining a first distribution for the leaf categories of the search results for the search query in the first query modality;
    determining a second distribution for the leaf categories of the search results for the search query in the second query modality; and
    based on comparing the first distribution to the second distribution, determining that the second distribution has a higher search performance for the search query in the second query modality.

9. The system of claim 6, further comprising:
    determining a first distribution for the one or more categories for historical search queries of an item corresponding to the search query using the first query modality;

determining a second distribution for the one or more categories for historical search queries of the item corresponding to the search query using the second query modality; and based on comparing the first distribution to the second distribution, determining to recommend use of the second query modality based on the second distribution having a higher search performance for the search query in the second query modality than in the first query modality.

10. The system of claim 9, wherein comparing the first distribution to the second distribution comprises determining meta-categories of the one or more categories contributing to a Kullback-Leibler divergence between the first distribution and the second distribution.

11. The system of claim 10, wherein comparing the first distribution to the second distribution comprises determining leaf categories contributing to the Kullback-Leibler divergence subsequent to determining the meta-categories.

12. A computer implemented method for providing a query modality recommendation, the method comprising:

receiving a search query in a first query modality at a search engine;

identifying one or more dominant categories associated with search results for the search query;

determining a performance of the one or more dominant categories for the first query modality and a second query modality based on a first distribution of categories associated with historical search queries in the first query modality and a second distribution of categories associated with historical search queries in the second query modality, the first query modality being a different form of a search query than the second query modality, wherein the historical search queries in the second query modality are associated with a second set of search results for an item associated with the search query that was purchased;

based on the performance of the one or more dominant categories for the first query modality and the second query modality, causing a recommendation to use the second query modality to be displayed; and receiving a second search query in the second query modality.

13. The method of claim 12, wherein the first query modality is an image query and the second query modality is a textual query.

14. The method of claim 12, wherein the historical search queries in the first query modality are associated with a first set of search results for items associated with the search query that were purchased, and wherein determining the performance of the one or more dominant categories comprises:

determining a non-symmetric distance measurement between the first distribution of categories for the first set of search results for the items associated with the search query and the second distribution of categories in the second query modality; and based on the non-symmetric distance measurement, determining that the second distribution has a higher performance than the first distribution.

15. The method of claim 12, wherein the performance of the one or more dominant categories for the first query modality and the second query modality is determined based on comparing the first distribution to the second distribution by determining meta-categories contributing to a Kullback-Leibler divergence between the first distribution and the second distribution.

16. The method of claim 15, further comprising subsequent to determining the meta-categories, determining leaf categories contributing to the Kullback-Leibler divergence between the first distribution and the second distribution.

* * * * *